(12) United States Patent
Swierkocki (10) Patent No.: US 12,122,946 B2
(45) Date of Patent: *Oct. 22, 2024

(54) LOW EMISSIVITY SEAM TAPE FOR INFLATABLE SAFETY PRODUCTS

(71) Applicant: Air Cruisers Company, LLC, Wall Township, NJ (US)

(72) Inventor: Thomas W. Swierkocki, Manasquan, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,850

(22) Filed: Dec. 22, 2022

(65) Prior Publication Data
US 2024/0209236 A1    Jun. 27, 2024

(51) Int. Cl.
*C09J 7/22* (2018.01)
*B64D 25/00* (2006.01)

(52) U.S. Cl.
CPC ............... *C09J 7/22* (2018.01); *B64D 25/00* (2013.01); *C09J 2301/16* (2020.08); *C09J 2400/163* (2013.01)

(58) Field of Classification Search
CPC ........ B64D 25/14; B64D 25/18; B64D 25/00; B29C 66/5221; B29C 65/18; B29C 66/73921; B29C 66/24221; B29C 66/439; B29C 66/54; B29C 66/133; B29C 66/729; B29C 66/0384; B29C 65/08; B29C 65/10; B29C 65/04; B29D 22/02; B29L 2031/3067; B29L 2031/5254; B29L 2031/3076; B29L 2031/485; B29L 2022/02; B63C 9/1255; B63C 9/04; B29K 2995/0067; C09J 7/21; C09J 7/35; C09J 2203/35; C09J 2301/12; C09J 2301/304; C09J 2400/163; C09J 2400/263;
(Continued)

(56) References Cited

U.S. PATENT DOCUMENTS 4,654,098 A    3/1987  Miller
2009/0220726 A1*  9/2009  Liggett .................... C09J 7/29
428/411.1
(Continued)

FOREIGN PATENT DOCUMENTS

WO    2015196216 A2    12/2015
WO    WO-2021005083 A1 *  1/2021  ............ C09J 175/04
WO    2022039814 A2    2/2022

OTHER PUBLICATIONS

International Application No. PCT/US2023/084689, International Search Report and Written Opinion mailed on Apr. 9, 2024, 12 pages.

*Primary Examiner* — Patricia L. Nordmeyer
(74) *Attorney, Agent, or Firm* — Kilpatrick Townsend & Stockton LLP (57) ABSTRACT

A seam tape, patch material, accessory material, or component material may be used for an inflatable safety product. The seam tape, patch material, accessory material, or component material includes an emissivity of less than or equal to 0.48. An inflatable safety product or an accessory for an inflatable safety product may include the seam tape, patch material, accessory material, or component material.

21 Claims, 4 Drawing Sheets

(58) Field of Classification Search
CPC ........ C09J 7/22; C09J 2301/16; D06M 17/04; D06M 2200/30; D06M 2200/35
See application file for complete search history.

(56) References Cited

U.S. PATENT DOCUMENTS

| | | |
|---|---|---|
| 2010/0266801 A1* | 10/2010 | Jahoda .................... E06B 9/24 |
| | | 428/339 |
| 2012/0251801 A1 | 10/2012 | Moore et al. |
| 2018/0180331 A1 | 6/2018 | Yu et al. |
| 2018/0333936 A1 | 11/2018 | Govindaraju et al. |
| 2019/0017785 A1 | 1/2019 | Morag et al. |

* cited by examiner

LOW EMISSIVITY SEAM TAPE FOR INFLATABLE SAFETY PRODUCTS

FIELD OF THE INVENTION

The field of the invention relates to seam tapes, patch materials, accessory, and component materials for inflatable safety products.

BACKGROUND

Federal aviation safety regulations require aircraft to provide evacuation and other safety provisions for passengers. These include evacuation slides, evacuation slide/rafts, ramps, slide/ramps, life rafts, life vests, helicopter floats, and other life-saving inflatable devices. Relevant inflatable products that can be improved using the materials of the present disclosure can include evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air- or gas-holding functions. These inflatable devices are generally built from an assembly of inflatable tubular structures that form air-beams that are sealed to one another. Inflatable escape slides and life rafts also have non-air-holding features, such as patches, floors, sliding surfaces, girts, handles, and other features.

Typically, in order to form the tubular structures, many pieces of fabric or flexible composite materials (which may be referred to herein as panels) are joined together. Safety regulations set strength requirements for the fabric or flexible composite materials itself (the field of the inflatable tube), as well as strength requirements for the seam areas. In certain embodiments, the tubular structures may be substantially leak proof when inflated to keep the inflation gas and air inside the tubes for long durations. In order to meet radiant heat resistance requirements of maintaining seam adhesion and gas barrier properties, a reflective paint coating is applied on the seam tapes, patches, accessories, and components, and portions of the fabric or flexible composite panels adjacent to the seam tape, patches, accessories, and components. Such reflective paint coatings add significant weight to the product and are time-consuming to apply during production of the inflatable products.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seam tape, patch material, accessory material, or component material for an inflatable safety product has an emissivity of less than or equal to 0.48.

According to certain embodiments of the present invention, a seam tape, patch material, accessory material, or component material for an inflatable safety product includes a substrate and a metallic layer covering at least one surface of the substrate. An emissivity of the seam tape, patch material, accessory material, or component material is less than or equal to 0.48.

According to certain embodiments of the present invention, a method of joining panels of an inflatable safety product includes adhering or welding a first panel and a second panel in a seam region formed by the first panel and the second panel using a seam tape. The seam tape may have an emissivity of less than or equal to 0.48.

According to certain embodiments of the present invention, a seam tape, patch material, accessory material, or component material for an inflatable safety product has an emissivity of less than or equal to 0.25.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a low emissivity seam tape, patch material, accessory material, or component material for inflatable safety products. While the low emissivity seam tape, patch material, accessory material, or component material is discussed for use with inflatable safety products, it is by no means so limited. Rather, embodiments of the low emissivity seam tape, patch material, accessory material, or component material may be used in inflatable products of any type or otherwise as desired.

Inflatable safety products such as inflatable evacuation slides, slide/rafts, ramps, and slide/ramps traditionally utilize a fabric or flexible composite material with a polyamide substrate such as Nylon 6,6 and thermoplastic polyurethane coatings. The thermoplastic polyurethane coatings are applied to the polyamide substrate to provide abrasion resistance and gas barrier properties.

Polyamide substrates have a relatively high melting point (e.g., about 514° F.) making them suitable for exposure to radiant heat during a fire. To provide additional radiant heat resistance during a fire (e.g., a fire on an aircraft or other vehicle), aluminum particles are dispersed within the thermoplastic polyurethane coating that is applied to the outside surfaces of the polyamide substrate. Dispersing the aluminum particles within the thermoplastic polyurethane coating traditionally results in the fabric or flexible composite material possessing an emissivity of about 0.72. While the thermoplastic polyurethane coating provides some radiant heat resistance, the higher melting point of the polyamide substrate allows for the fabric or flexible composite material to maintain its structural integrity. However, fabrics or flexible composite material utilizing polyamide substrates and thermoplastic polyurethane coatings are generally heavy, and or bulky, thereby taking up weight, space, or volume on vehicles with weight restrictions such as aircraft.

In various embodiments, the fabric or flexible composite materials described herein are utilized on inflatable safety equipment that is typically deflated, folded, and compressed to fit into confined areas on aircraft doors, within an aircraft fuselage, or in an aircraft storage compartment, thereby taking up space or volume on vehicles with volume restrictions such as aircraft.

Other types of materials that may have a lower weight have traditionally been avoided for the substrate due to lower melting temperatures of such materials, and such fabrics or flexible composite material would melt even with the thermoplastic polyurethane coating. As an example, polyethylene substrates such as but not limited to ultra-high molecular weight polyethylene (UHMWPE) have been avoided for inflatable safety products due to a significantly lower melting point (about 297° F.) compared to polyamide substrates, and the heat absorbed would cause the polyethylene substrates to melt.

Described herein are seam tapes, patch materials, accessory materials, or component materials with an emissivity of less than or equal to 0.48. An emissivity of 0 would mean that the fabric or flexible composite material reflects all heat, and a temperature of the fabric or flexible composite material would not significantly change when exposed to radiant heat. Conversely, an emissivity of 1 would mean that the fabric or flexible composite material is a perfect absorber, and all the heat would be absorbed. Compared to traditional seam tapes, patch materials, accessory materials, or component materials that require a reflective paint coating to maintain adhesion and gas barrier properties when exposed to radiant heat, the seam tapes, patch materials, accessory materials, or component materials described herein do not require such a coating to maintain adhesion and gas barrier properties. As such, the seam tapes, patch materials, accessory materials, or component materials described herein may have a reduced weight and/or decreased assembly time, thereby providing cost, weight, and time savings.

In certain embodiments, the seam tapes, patch materials, accessory materials, or component materials are a fabric or flexible composite material that include a substrate with a covering layer. In some embodiments, the covering layer is a thermoplastic polyurethane coating with dispersed metallic particles within the coating, and the thermoplastic polyurethane coating covers at least one surface of the substrate. In other embodiments, the covering layer is a metallic layer covering at least one surface of the substrate. The fabric or flexible composite materials with the substrate and covering layer with dispersed metallic particles may provide a seam tape, patch material, accessory material, or component material having an emissivity of less than or equal to 0.48. The fabric or flexible composite materials with the substrate and metallic layer covering at least one surface of the substrate may provide a seam tape, patch material, accessory material, or component materials having an emissivity of less than or equal to 0.25. The seam tapes, patch materials, or accessory materials, or component materials with the emissivity described herein may maintain seam adhesion and/or gas barrier properties when exposed to radiant heat.

The seam tapes, patch materials, accessory material, or component material described herein may be used for various inflatable products and/or accessories for inflatable products as desired. As non-limiting examples, the material described herein may be a material for a seam tape joining panels of an inflatable safety product such as but not limited to an inflatable evacuation slide, inflatable evacuation slide/raft, inflatable evacuation ramp, or inflatable evacuation slide/ramp. As another non-limiting example, the material described herein may be material for an accessory such as but not limited to a patch, girt, handle, structural attachment, or pouch.

Various other advantages and benefits may be realized with the systems and methods described herein, and the aforementioned benefits should not be considered limiting.

Figure 1:
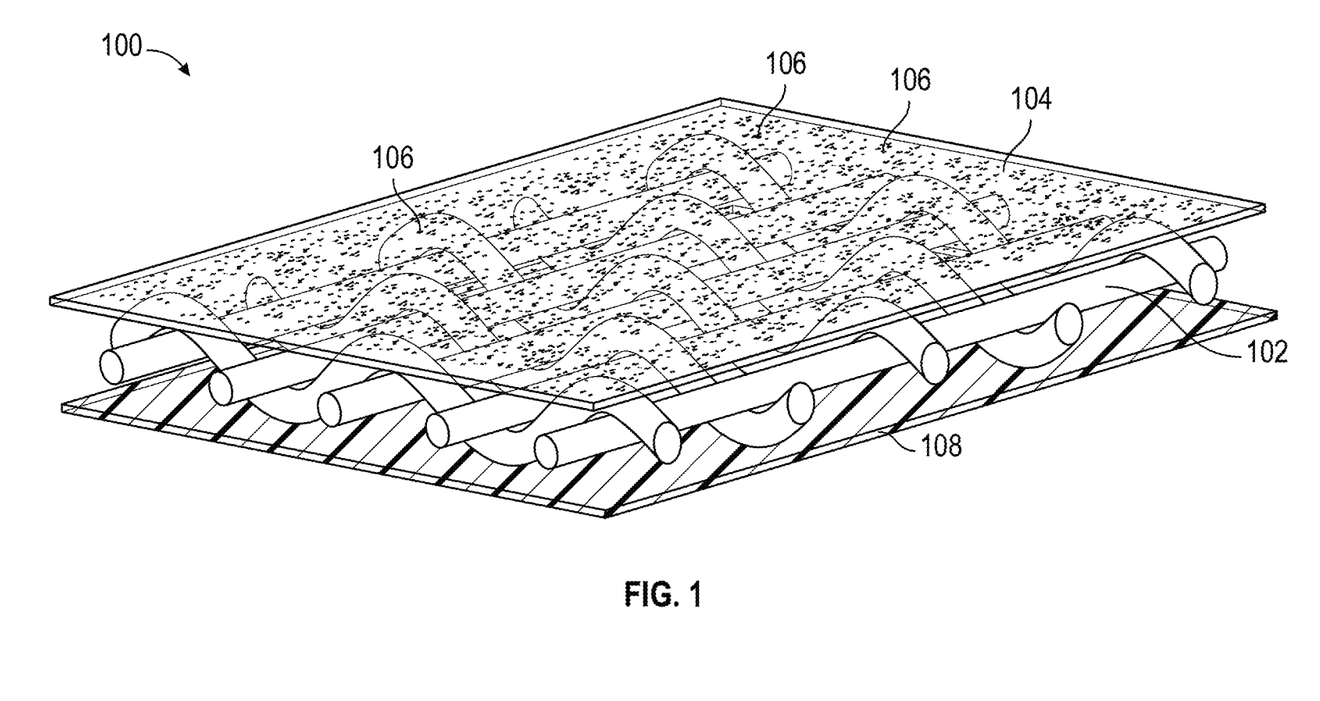
FIG. 1 is a cross-sectional view of a seam tape, patch material, accessory material, or component material with a substrate and a metallic layer according to certain embodiments of the present invention.

FIG. 1 is a cross sectional view of a seam tape, patch material, accessory material, or component material 100 for a seam tape, patch, accessory, or component according to embodiments and with an emissivity of less than or equal to 0.48. In other words, when subjected to radiative heat, the seam tape, patch material, accessory, or component material 100 may reflect about 50% of the heat. The seam tape, patch material, accessory or component material 100 generally includes a substrate 102 and a covering layer 104.

The substrate 102 can be various flexible composite or fabric materials as desired. As non-limiting examples, the substrate 102 may include polyethylene, ultra-high molecular weight polyethylene, polypropylene, polyester, polyamide, aromatic polyamide, aramid, polyolefin, aromatic polyester, polyarylate, other liquid crystal polymers, or nylon, other suitable substrate material, or any combination thereof. As additional non-limiting examples, the substrate 104 may be a material such as but not limited to those sold under the trade names Dyneema®, Spectra®, Innegra®, Vectran®, Nylon-6, or Nylon 6-6. In one non-limiting example, the substrate 102 is a polyester substrate or a polyamide substrate. In other non-limiting example, the substrate 102 is a polyethylene substrate or a polypropylene substrate.

Optionally, the substrate 102 is a material having a weight less than that of a polyamide substrate, such as a material having a weight less than approximately 4 ounces/yd$^2$, such as a weight less than approximately 3 ounces/yd$^2$, such as a weight less than approximately 2 ounces/yd$^2$, such as a weight of less than approximately 1 ounce/yd$^2$, such as a weight less than approximately 0.5 ounces/yd$^2$.

In certain embodiments, the seam tape, patch material, accessory or component material 100 described herein may have a weight less than 8 ounces/yd$^2$, such as less than 6 ounces/yd$^2$, such as less than 5 ounces/yd$^2$, such as less than 4 ounces/yd$^2$, such as less than 3 ounces/yd$^2$, such as less than 2 ounces/yd$^2$, such as less than 1 ounce/yd$^2$, such as less than 0.5 ounces/yd$^2$.

The covering layer 104 covers at least one surface of the substrate 102. In various embodiments, the covering layer 104 includes various metals or metallic elements as desired, including but not limited to aluminum, aluminum alloys, titanium, titanium alloys, nickel, nickel alloys brass, brass alloys, steel, steel alloys, stainless steel, stainless steel alloys, silver, a silver alloy, combinations thereof, and/or any other suitable metal or metallic elements as desired.

In some embodiments, and referring to FIG. 1, the covering layer 104 is a thermoplastic polyurethane coating with metallic elements or particles 106 dispersed within the coating. In one non-limiting example, the covering layer 104 is a thermoplastic polyurethane coating with aluminum particles dispersed within the thermoplastic polyurethane coating. In such embodiments, the covering layer 104 with dispersed metallic elements or particles 106 may be considered a discontinuous metallic layer.

Figure 2:
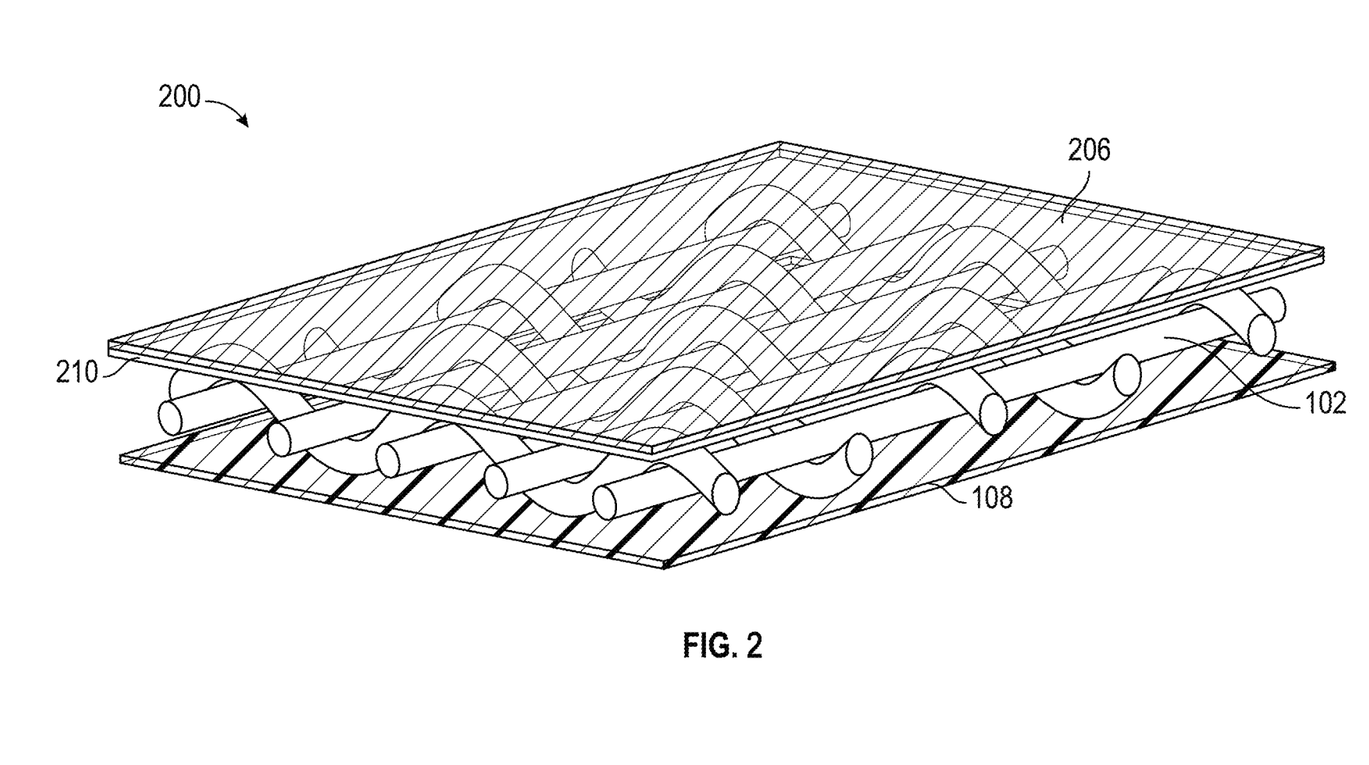
FIG. 2 is a cross-sectional view of another seam tape, patch material, accessory material, or component material fabric or flexible composite material with a substrate and a metallic layer according to certain embodiments of the present invention.

In other embodiments, and as illustrated in FIG. 2, the metallic elements or particles are provided as a metallic layer 206 may be a covering layer (completely covering layer or discontinuously covering layer) of the seam tape, patch material, accessory material, or component material 100. In such embodiments, the metallic layer 206 may be provided in place of the covering layer 104 and/or in addition to the covering layer 104. In certain embodiments, the metallic layer 206 is a covering layer, meaning that the portions of the metallic layer 206 are interconnected even though an entirety of the at least one surface of the substrate 102 is not necessarily covered. In other embodiments, the metallic layer 206 may be discontinuous and/or provided at discrete locations covering at least one surface of the substrate 102. The metallic layer 206 may be deposited on, adhered to, and/or otherwise positioned on the substrate 102 and/or the covering layer 104 using various techniques as desired. As a non-limiting example, the metallic layer 206 may be printed on the substrate 102 or covering layer 104, may be adhered to the substrate 102 or covering layer 104 via epoxies or other adhering materials, may be deposited on the substrate 102 or covering layer 104, may be vapor-deposited on the substrate 102 or covering layer 104, or the like. In some embodiments, the metallic layer 206 is plated on the substrate 102 or covering layer 104, sputtered on the substrate 102 or covering layer 104, or the like. In some embodiments, the metallic layer 206 is a metallic foil layer adhered to the substrate 102 or covering layer 104.

In certain embodiments, the covering layer 104 with the dispersed metallic particles in the thermoplastic polyurethane coating optionally may provide a different emissivity compared to the metallic layer 206 as the covering layer. In some embodiments, the emissivity of the covering layer 104 with dispersed metallic particles in the thermoplastic polyurethane coatings has an emissivity of less than or equal to 0.48, and the metallic layer 206 as the covering layer 104 may have an emissivity of less than or equal to 0.25. As such, the seam tape, patch material, accessory material, or component material 100 described herein may include a tailored emissivity to reflect heat as desired when subjected to radiative heat. With the emissivity of less than or equal to 0.48, the seam tape, patch material, accessory material, or component material 100 may maintain adhesion and gas barrier properties when exposed to radiant heat.

In certain embodiments, the type of covering layer (e.g., dispersed metallic particles in the thermoplastic polyurethane covering layer 104 or metallic layer 206) may depend on the material used as the substrate 102. As non-limiting examples, the dispersed metallic particles in the thermoplastic polyurethane coating may be utilized as the covering layer 104 for substrates formed of materials having relatively increased melting points, and the metallic layer 206 may be utilized as the covering layer for substrates formed of materials having relatively decreased melting point. As a non-limiting example, a polyamide substrate or a polyester substrate may include the covering 104 formed of the dispersed metallic particles in the thermoplastic polyurethane coating, and a polyethylene substrate or a polypropylene substrate may include the metallic layer 206 as the covering layer.

In some embodiments, the covering layer 104 may form an outer-most layer of the seam tape, patch material, accessory material, or component material 100. However, in other embodiments, it need not be, and the covering layer 104 optionally may be covered by an exterior layer (and the exterior layer is an outer-most layer). When included, the exterior layer may be various types of materials as desired, and in certain embodiments the exterior layer may protect the covering layer 104. In one non-limiting example, the exterior layer may be an acrylic coating, although in other embodiments other suitable materials may be utilized as desired. Optionally, and when included, the exterior layer may include a thin film layer or other suitable layer that may minimize and/or prevent oxidation or corrosion of the covering layer 104 and deterioration of the fabric or flexible composite material due to hydrolysis. In some embodiments, the exterior layer optionally includes a passivation layer, a parkerized layer, or other suitable layer that may be formed via a controlled oxidation process.

Optionally, the seam tape, patch material, accessory material, or component material 100 includes an inner layer 108. In some embodiments, the covering layer 104 may be provided on a first surface (e.g., an upper and/or outer surface) of the substrate 102, and the inner layer 108 may be provided on a second surface (e.g., a lower and/or inner surface) of the substrate 102. When included, the inner layer 108 may provide an air-tight or gas-tight seal for the seam tape, patch material, accessory material, or component material. The inner layer 108 may be constructed from various materials or combinations of materials as desired. As non-limiting examples, the inner layer 108 may be a plastic-based layer, a urethane-based layer, a metallic layer, combinations thereof, and/or any other suitable layer that can be positioned on the second surface of the substrate 102 for allowing the seam tape, patch material, accessory material, or component material 100 to be inflated with air or other gases. In certain embodiments the inner layer 108 and/or the covering layer 104 may be a film layer. The film layer may be acrylic, nylon, polyolefin, modified polyolefin, polyurethane, vinyl, polyethylene (PE), polypropylene (PP), polyamide (PA), fluoropolymer, polyethylene terephthalate (PET), polystyrene, ethylene vinyl acetate (EVOH), polyvinylidene chloride (PVDC), polycarbonate (PC), polyvinyl chloride (PVC), polylactic acid (PLA), polyvinyl alcohol (PVOH), ethylene-chlorotrifluoroethylene, polyetherketone (PEK), polyetheretherketone (PEEK), polyetherketoneketone (PEKK), or any combination thereof, or any appropriate materials.

As mentioned, FIG. 2 illustrates another example of a seam tape, patch material, accessory material, or component material 200 for an inflatable safety product according to embodiments. The seam tape, patch material, accessory material, or component material 200 is substantially similar to the seam tape, patch material, accessory material, or component material 100 except that the seam tape, patch material, accessory material, or component material 200 includes the metallic layer 206 in place of the covering layer 104.

Figure 4:
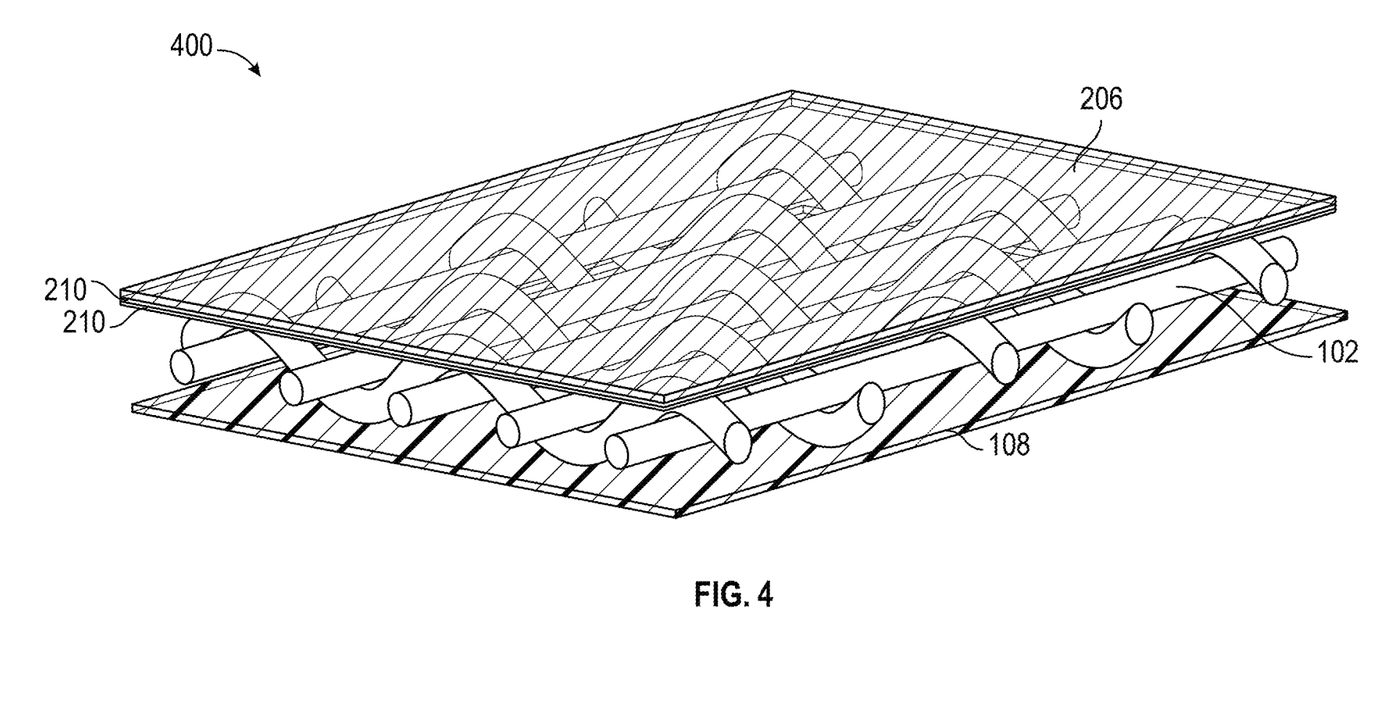
FIG. 4 is a cross-sectional view of a seam tape, patch material, accessory material, or component material with a completely covering metallic layer for an inflatable safety product and that includes a substrate with an adhesive layer and a film layer that the metallic layer is covering according to certain embodiments of the present invention.

In some embodiments, and as illustrated in FIGS. 2 and 4, a seam tape, patch material, of accessory material, or component material additionally includes intermediate adhesive layers and/or film layers 210 between the metallic layer 206 (and/or covering layer 104) and the substrate 102. The number of intermediate adhesive layers and/or film layers illustrated in FIGS. 2 and 4 is for illustrative purposes only and should not be considered limiting. In various embodiments, a fabric or flexible composite material according to embodiments may include an adhesive layer, a film layer, or both an adhesive layer and a film layer. In FIG. 2, a single layer 210 is provided, and in FIG. 4, two layers 210 are provided. The intermediate adhesive layer and/or film layer 210, and when included, may facilitate adhering of the covering layer 104 and/or the metallic layer 206 to the substrate 102. As a non-limiting example, the intermediate layer 210 may be deposited on, adhered to, attached to, or otherwise positioned on the substrate 102, and the covering layer 104 and/or the metallic layer 206 may be deposited on, plated on, sputtered on, adhered to, attached to, or otherwise provided on the intermediate layer 210. As non-limiting examples, the covering layer 104 and/or the metallic layer 206 may be a printed metallic layer, an adhered metallic layer, deposited metallic layer, a vapor deposited metallic layer, a plated metallic layer, a metallic foil layer or a sputtered metallic layer or otherwise provided on the intermediate layer 210

Figure 3:
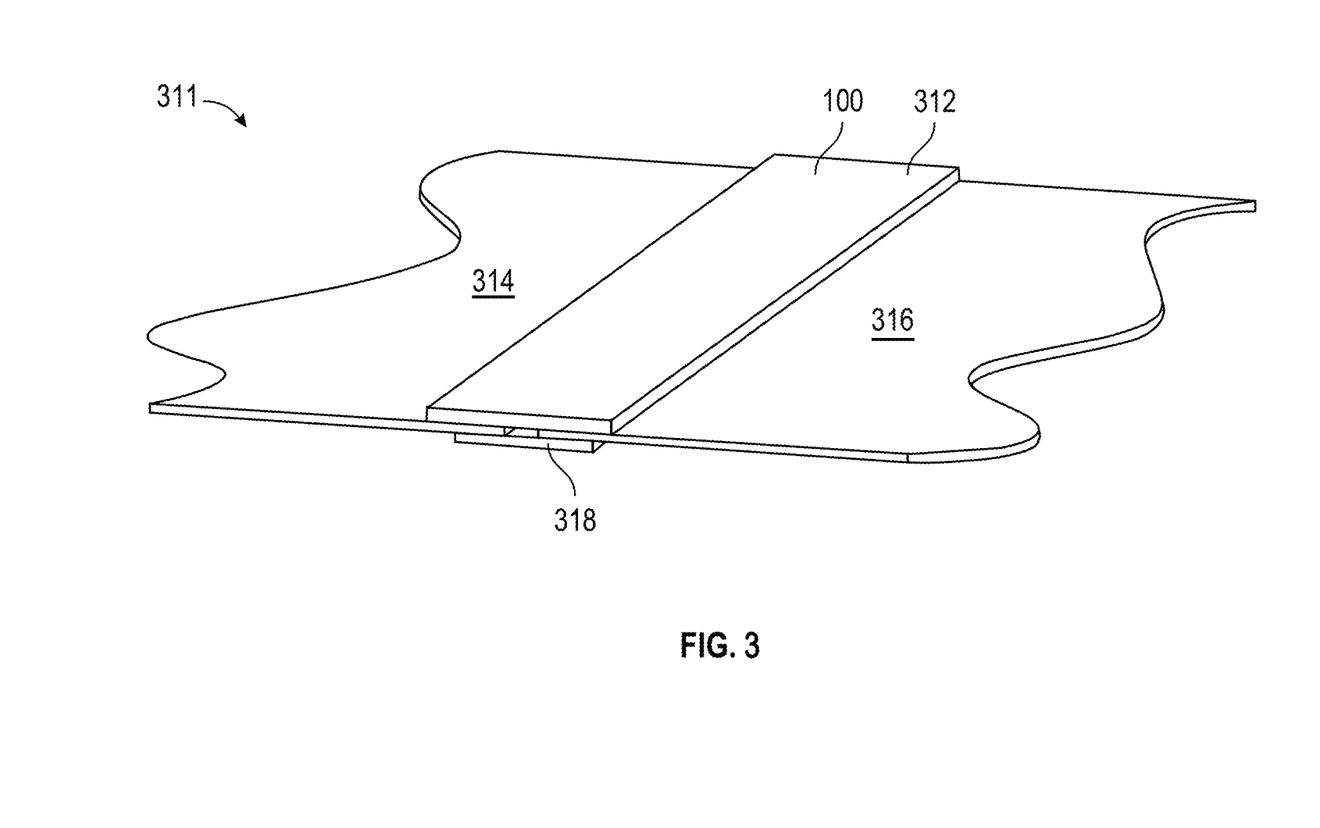
FIG. 3 is a cross-sectional view of a first fabric or flexible composite panel and a second fabric or flexible composite panel adhered or welded together with a seam tape according to certain embodiments of the present invention.

FIG. 3 is a cross-sectional view of an inflatable product 311 with the seam tape, patch material, accessory material, or component material 100 provided as a seam tape 312. As illustrated in FIG. 3, the seam tape 312 is provided to weld a seam region (e.g., a butt seam) formed by a first fabric or flexible composite panel 314 and a second fabric or flexible composite panel 316. Optionally, an air holding or gas holding film 318 is provided in the seam region and on a surface of the panels 314, 316 opposite from the seam tape 312. In various embodiments, the seam tape 312 has an emissivity of less than or equal to 0.48, such as less than or equal to 0.25. While the accessory material 100 is illustrated as the seam tape 312 for the inflatable product 311 in FIG. 3, as previously mentioned, in other embodiments, the seam tape, patch material, accessory material, or component material 100 may be provided as an accessory, such as but not limited to a patch, girt, handle, structural attachment, or pouch.

FIG. 4 illustrates another example of a seam tape, patch material accessory material, or component material 400 for an inflatable safety product according to embodiments. The seam tape, patch material accessory material, or component material 400 is substantially similar to the seam tape, patch material accessory material, or component material 200 except that the seam tape, patch material accessory material, or component material 400 additionally includes a plurality of layers 210 between the covering layer (e.g., metallic layer 206 and/or covering layer 104) and the substrate 102. The layers 210 may be adhesive layers and/or film layers, or any combination thereof and when included, may facilitate adhering of the covering layer to the substrate 102 or other layer 210. As a non-limiting example, the layers 210 may be deposited on, adhered to, attached to, or otherwise positioned on the substrate 102, and the covering layer may be a printed metallic layer, an adhered metallic layer, deposited metallic layer, a vapor deposited metallic layer, a plated metallic layer, a metallic foil layer or a sputtered metallic layer or otherwise provided on the layers 210.

In addition to maintaining adhesion and/or gas barrier properties when exposed to radiant heat, the seam tape, patch material, accessory material, or component 100 with the substrate and covering material may enhance other properties. As non-limiting examples, the seam tape, patch material, accessory material, or component material described herein are lightweight and easier to assemble because they do not require the reflective paint coating to maintain adhesion and gas barrier properties when exposed to radiant heat, thereby providing weight, cost, and time savings. The seam tape, patch material, accessory material, or component material described herein may also have improved abrasion resistance compared to traditional seam tapes, patches, accessories, or components.

FAA Requirements

In various embodiments, the fabric or flexible composite material described herein may meet and/or exceeds the fabric or flexible composite material requirements according to TSO-C69c from the Federal Aviation Administration (FAA), entitled EMERGENCY EVACUATION SLIDES, RAMPS, RAMP/SLIDES, AND SLIDE RAFTS and published Aug. 18, 1999 ("TSO-C69c") (incorporated herein by reference), TSO-C13f from the FAA, entitled LIFE PRESERVERS and published Sep. 24, 1992 ("TSO-C13f") (incorporated herein by reference), and/or TSO-C70b from the FAA, entitled LIFE RAFTS and published Aug. 4, 2014 ("TSO-C70b") (incorporated herein by reference).

Required tests include: seam peel strength, seam shear strength, tensile strength (grab test), tear strength (trapezoid test), tear strength (tongue test), ply adhesion, coat adhesion, temperature resistance, radiant heat resistance, puncture strength, tear propagation, chafe resistance, flammability (vertical burn rate), pressure retention, permeability, porosity (hydrolysis), hydrolysis conditioning, resistance to hydrolysis, fluids exposure, and accelerated aging Seam Adhesion TSO-C69c Requirement As a non-limiting example, the fabric or flexible composite material adhered or welded to the fabric or flexible composite material of the inflatable safety product creating a seam region, when separated from the fabric or flexible composite material of the inflatable safety product, at or about a 180° angle, at a separation rate of between 2 and 2.5 inches/minute, at a temperature between 70° F. to 72° F., wherein the average of at least 5 specimens must resist separation with a force of 5 pounds/inch width or greater. The aforementioned resistance to separation, described herein peel strength as referenced in TSOs, such as but not limited to TSO-C69c from the FAA.

As a further non-limiting example, any coatings, films, or layers applied to the substrate of the fabric or flexible composite material, when separated from the substrate or other layers used in the construction of the fabric or flexible composite material, of the inflatable safety product, at or about a 180° angle, at a separation rate of between 2 and 2.5 inches/minute, at a temperature of between 70° F. to 72° F., wherein the average of at least 5 specimens must resist separation with a force of 5 pounds/inch width or greater. The aforementioned resistance to separation, described herein ply adhesion and coating adhesion as referenced in TSOs, such as but not limited to TSO-C69c from the FAA.

Seam Shear
TSO-C69c Requirement

As a non-limiting example, the fabric or flexible composite material adhered or welded to the fabric or flexible composite material of the inflatable safety product creating a seam region, when used to create a specimen of the seam region and with the fabric or flexible composite material adhered or welded with a ¾ inch maximum overlap, at a separation rate between 11.5 and 12.5 inches/minute, at a temperature of 75° F., wherein the average of at least 3 specimens must resist separation with a force of 175 pounds/inch width or greater when pulled in the shear direction.

As a further non-limiting example, the fabric or flexible composite material adhered or welded to the fabric or flexible composite material of the inflatable safety product creating a seam region, when used to create a specimen of seam region 2 inches in length and with the fabric or flexible composite material adhered or welded at a ¾ inch maximum overlap, at a separation rate of between 11.5 and 12.5 inches/minute, at a temperature of 140° F., wherein the average of at least 3 specimens must resist separation with a force of 40 pounds/inch width or greater when the pulled in the shear direction. The aforementioned resistance to separation, describes shear strength as referenced in TSOs, such as but not limited to TSO-C69c from the FAA.

Tensile and Tear Strength
TSO-C69c Requirement

As a non-limiting example, the fabric or flexible composite material of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging (exposed to a temperature of 158±4° F. for not less than 168 hours), the fabric or flexible composite of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must resist separation with a maximum force of an average of at least 190 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must a resist separation with a maximum force of an average of at least 190 pounds/inch in warp direction and fill direction (along the manufacturing length and width of the fabric or flexible composite material).

Air Holding & Gas Holding
TSO-C69c Requirement

As a non-limiting example, the fabric or flexible composite material, described herein when configured into an inflatable safety product must withstand a pressure of at least 1.5 times the maximum operating pressure for at least 5 minutes of its intended use.

As a further non-limiting example, the fabric or flexible composite material, described herein when configured into an inflatable safety product must withstand a pressure of at least 2 times the maximum operating pressure for at least 1 minute, of its intended use.

As a further non-limiting example, the fabric or flexible composite material, described herein when configured into an inflatable safety inflatable safety product, when inflated to its operating pressure of intended use must not fall below at least 50 percent of its initial pressure in a period less than 12 hours.

As a further non-limiting example, the fabric or flexible composite material, described herein when configured into an inflatable safety product, that is capable of being used as a life raft or flotation device when inflated to its operating pressure of intended use must not fall below the minimum raft mode operating pressure in less than 24 hours.

Helium Permeability
TSO-C69c Requirement

As a non-limiting example, the fabric or flexible composite material of the inflatable safety product, when at least 3 specimens are prepared and tested as per Federal Test Method Standard—Method 5460 or ASTM Method D1434-82, Procedure V, have a maximum permeability of Helium of 10 liters per square meter in 24 hours at 77° F. or its equivalent in Hydrogen when a pressure is applied to the chamber on the side of the test specimen that separates the test gas (Helium or its equivalent in Hydrogen) from the chamber receiving the permeating gas.

Temperature Resistance

TSO-C69c Requirement:

As a non-limiting example, the fabric or flexible composite material, seam tape, accessory material and or product accessories described herein when exposed to temperatures from −40° F. to 160° F. must remain fully functioning per its intended use as referenced in TSOs, such as but not limited to TSO-C69c from the FAA.

As a further non-limiting example, the fabric or flexible composite material, seam tape, accessory material and or product accessories described herein must remain fully functioning per its intended use after exposure to a storage temperature of 185° F. or greater as referenced in TSOs, such as but not limited to TSO-C69c from the FAA.

As a further non-limiting example, the fabric or flexible composite material, seam tape, accessory material and or product accessories described herein must remain fully functioning per its intended use after being stowed at a temperature −65° F. or less as referenced in TSOs, such as but not limited to TSO-C69c from the FAA.

Radiant Heat Resistance

TSO-C69c Requirement

As a further non-limiting example, the fabric or flexible composite material described herein when exposed to a radiant heat flux of 1.5 Btu/ft$^2$-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Fluids Exposure

TSO-C70b Requirement

As a further non-limiting example, the fabric or flexible composite material described herein must be capable of withstanding the detrimental effects of exposure to fuels, oils, hydraulic fluids, and sea water. After being exposed to fuels, oils, hydraulic fluids, and sea water, a seam will not have a decrease in seam strength or coat adhesion of more than 10%.

As a further non-limiting example, the fabric or flexible composite material, described herein must remain capable of withstanding the detrimental effects of exposure to fuels, oils, hydraulic fluids, and sea water with no loss in air holding or gas holding properties. After being exposed to fuels, oils, hydraulic fluids, and sea water, the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C70b from the FAA.

Hydrolysis

TSO-C69c Requirement

As a further non-limiting example, the fabric or flexible composite material, described herein must remain capable of withstanding the detrimental effects of hydrolysis exposure to a temperature of 136±4° F. at a relative humidity of 95±4 percent for a period of 50 days with no loss in air holding or gas holding properties. After hydrolysis exposure to a temperature of 136±4° F. at a relative humidity of 95±4 percent for a period of 50 days the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 20% as referenced in TSOs, such as but not limited to TSO-C69c from the FAA.

Tear Propagation

TSO-C69c Requirement

As a non-limiting example, the fabric or flexible composite material, described herein when must not allow a tear to propagate beyond the implement that caused an initial puncture or tear as referenced in TSOs, such as but not limited to TSO-C69c from the FAA.

Accelerated Aging

TSO-C69c Requirement

As a further non-limiting example, the fabric or flexible composite material, described herein must remain capable of withstanding the detrimental effects of accelerated aging at a temperature of 158±4° F. for not less than 168 hours with no loss in air holding or gas holding properties. After accelerated aging at a temperature of 158±4° F. for not less than 168 hours the fabric or flexible composite material, seam tape, accessory material wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C69c from the FAA.

Flammability

TSO-C69c Requirement

As a non-limiting example, the fabric or flexible composite material, described herein, wherein the average of at least 3 specimens in warp direction and fill direction (along the manufacturing length and width of the fabric or flexible composite material material) are located ¾ inches above the top edge of a burner apparatus, for a period of 12 seconds is exposed to a flame with a total length of 1.5 inches and an inner cone length of ⅞ inches, and minimum temperature of 1550° F., shall not burn for more than 15 seconds after the flame is removed, shall not burn more than 8 inches in the vertical direction, wherein any material that drips form the specimen shall not burn to more than 5 seconds, as referenced such as but not limited to the flammability requirements of 14 CFR part 25.853(a), Appendix F, Part I (a)(1)(ii) as referenced in TSOs, such as but not limited to TSO-C69c from the FAA.

EXAMPLES

A collection of exemplary embodiments is provided below, including at least some explicitly enumerated as "Examples" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Example 1. A seam tape, patch material, accessory material, or component material for an inflatable safety product, the seam tape, patch material, accessory material, or component material comprising an emissivity of less than or equal to 0.48.

Example 2. The seam tape, patch material, accessory material, or component material of any of the preceding or subsequent examples or combination of examples, wherein the seam tape, patch material, accessory material, or component material comprises a polyethylene substrate, an ultra-high molecular weight polyethylene substrate, a polypropylene substrate, a polyester substrate, a polyamide substrate, a polyolefin substrate, an aromatic polyester substrate, an aromatic polyamide substrate, an aramid substrate, a polyarylate substrate, another liquid crystal polymers substrate, or a nylon substrate.

Example 3. The seam tape, patch material, accessory material, or component material of any of the preceding or subsequent examples or combination of examples, wherein the seam tape, patch material, or accessory material comprises a metallic layer.

Example 4. The seam tape, patch material, accessory material, or component material of any of the preceding or subsequent examples or combination of examples, wherein the metallic layer is discontinuous.

Example 5. The seam tape, patch material, accessory material, or component material of any of the preceding or subsequent examples or combination of examples, wherein the metallic layer is completely covering.

Example 6. The seam tape, patch material, accessory material, or component material of any of the preceding or subsequent examples or combination of examples, wherein the metallic layer is covered by an exterior layer to prevent damage, oxidation, and/or corrosion of the metallic layer.

Example 7. The seam tape, patch material, accessory material, or component material of any of the preceding or subsequent examples or combination of examples, wherein the metallic layer is covered by an exterior layer to prevent deterioration of the seam tape, patch material, accessory material, or component material due to hydrolysis.

Example 8. The seam tape, patch material, accessory material, or component material of any of the preceding or subsequent examples or combination of examples, wherein the metallic layer is covered by an exterior layer to promote adhesion to the metallic layer.

Example 9. The seam tape, patch material, accessory material, or component material of any of the preceding or subsequent examples or combination of examples, wherein the metallic layer is covered by an exterior layer to improve the durability of the metallic layer.

Example 10. The seam tape, patch material, accessory material, or component material of any of the preceding or subsequent examples or combination of examples, wherein the metallic layer is covered by an exterior layer to prevent deterioration of the seam tape, patch material, accessory material, or component material due to hydrolysis.

Example 11. The seam tape, patch material, accessory material, or component material of any of the preceding or subsequent examples or combination of examples, wherein the seam tape, patch material, accessory material, or component material comprises: a substrate or flexible composite material; a metallic layer covering at least one surface of the substrate; and an adhesive layer and/or a film layer between the substrate and completely covering metallic layer.

Example 12. The seam tape, patch material, accessory material, or component material of any of the preceding or subsequent examples or combination of examples, wherein the metallic layer is discontinuous.

Example 13. The seam tape, patch material, accessory material, or component material of any of the preceding or subsequent examples or combination of examples, wherein the metallic layer is completely covering.

Example 14. The seam tape, patch material, accessory material, or component material of any of the preceding or subsequent examples or combination of examples, wherein the substrate comprises polyethylene, ultra-high molecular weight polyethylene, polypropylene, polyester, polyamide, aromatic polyamide, aramid, polyolefin, aromatic polyester, polyarylate, other liquid crystal polymers, or nylon Example 15. The seam tape, patch material, accessory material, or component material of any of the preceding or subsequent examples or combination of examples, wherein the metallic layer comprises aluminum, an aluminum alloy, nickel, a nickel alloy, brass, a brass alloy, steel, a steel alloy, stainless steel, a stainless steel alloy, silver, a silver alloy, combinations thereof, or any other suitable metal or metallic alloy.

Example 16. The seam tape, patch material, accessory material, or component material of any of the preceding or subsequent examples or combination of examples, wherein at least a portion of a surface of the substrate is not covered by the metallic layer.

Example 17. The seam tape, patch material, accessory material, or component material of any of the preceding or subsequent examples or combination of examples, wherein the metallic layer covers substantially an entire surface of the substrate.

Example 18. The seam tape, patch material, accessory material, or component material of any of the preceding or subsequent examples or combination of examples, further comprising a coating or film on the completely covering metallic layer.

Example 19. An inflatable safety product comprising: a first panel; a second panel, the first panel and the second panel forming a seam region; and the seam tape of any of the preceding or subsequent examples or combination of examples, wherein the seam tape welds the first panel and the second panel in the seam region.

Example 20. The inflatable safety product of any of the preceding or subsequent examples or combination of examples, wherein the seam tape is adhered to the first panel and the second panel of the inflatable safety product to form a butt seam.

Example 21. The inflatable safety product of any of the preceding or subsequent examples or combination of examples, wherein the inflatable safety product comprises an inflatable evacuation slide, inflatable evacuation slide/raft, inflatable evacuation ramp, or inflatable evacuation slide/ramp.

Example 22. An accessory for an inflatable safety product comprising the accessory material of any of the preceding or subsequent examples or combination of examples, wherein the accessory is a patch, girt, handle, structural attachment, or pouch.

Example 23. A seam tape, patch material, accessory material, or component material for an inflatable safety product, the seam tape, patch material, accessory material, or component material comprising a substrate and a metallic layer covering at least one surface of the substrate, wherein an emissivity of the seam tape, patch material, accessory material, or component material is less than or equal to 0.48.

Example 24. The seam tape, patch material, accessory material, or component material of any of the preceding or subsequent examples or combination of examples, wherein the metallic layer is discontinuous.

Example 25. The seam tape, patch material, accessory material, or component material of any of the preceding or subsequent examples or combination of examples, wherein the metallic layer is completely covering, and the emissivity is less than or equal to 0.25.

Example 26. The seam tape, patch material, accessory material, or component material of any of the preceding or subsequent examples or combination of examples, wherein the completely covering metallic layer is a vapor deposited metallic layer, a plated metallic layer, a sputtered metallic layer, a deposited metallic layer, an adhered metallic layer, a metallic foil layer, or a printed metallic layer.

Example 27. A method of joining panels of an inflatable safety product, the method comprising adhering or welding a first panel and a second panel in a seam region formed by the first panel and the second panel using a seam tape, wherein the seam tape comprises an emissivity of less than or equal to 0.48.

Example 28. The method of any of the preceding or subsequent examples or combination of examples, wherein the seam tape comprises a substrate and a completely covering metallic layer covering at least one surface of the substrate.

Example 29. A seam tape, patch material, accessory material, or component material for an inflatable safety product, the seam tape, patch material, accessory material, or component material comprising an emissivity of less than or equal to 0.25.

Example 30. The seam tape, patch material, accessory material, or component material of any of the preceding or subsequent examples or combination of examples, wherein the seam tape, patch material, accessory material, or component material a polyethylene substrate, an ultra-high molecular weight polyethylene substrate, a polypropylene substrate, a polyester substrate, a polyamide substrate, an aromatic polyamide substrate, an aramid substrate, a polyolefin substrate, an aromatic polyester substrate, a polyarylate substrate, another liquid crystal polymers substrate, or a nylon substrate.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. An inflatable safety product comprising a fabric or flexible composite material as a seam tape, patch material, accessory material, or component material, wherein the fabric or flexible composite material comprises an emissivity of less than or equal to 0.48 and a radiant heat resistance of at least 180 seconds, when exposed to radiant heat flux of 1.5 Btu/ft$^2$-sec or greater, for at least 180 seconds, wherein the fabric or flexible composite material comprises:
- a substrate having opposing surfaces, the substrate comprising polyethylene, ultra-high molecular weight polyethylene, polypropylene, polyamide, aromatic polyamide, polyarylate, or a liquid crystal polymer;
- a metallic layer covering at least one of the opposing surfaces of the substrate; and
- an intermediate layer between the substrate and the metallic layer, wherein the intermediate layer is adhesive layer and/or a film layer.

2. The inflatable safety product of claim 1, wherein the metallic layer is discontinuous.

3. The inflatable safety product of claim 1, wherein the metallic layer is completely covering.

4. The inflatable safety product of claim 1, wherein the metallic layer is covered by an exterior layer, wherein the exterior layer is configured to prevent damage, oxidation, and/or corrosion of the metallic layer.

5. The inflatable safety product of claim 1, wherein the metallic layer is covered by an exterior layer to prevent deterioration due to hydrolysis.

6. The inflatable safety product of claim 1, wherein the metallic layer is covered by an exterior layer configured to promote adhesion to the metallic layer.

7. The inflatable safety product of claim 1, wherein the metallic layer is covered by an exterior layer to improve durability of the metallic layer.

8. The inflatable safety product of claim 1, wherein the metallic layer comprises at least one of aluminum, an aluminum alloy, nickel, a nickel alloy, brass, a brass alloy, steel, a steel alloy, stainless steel, a stainless steel alloy, silver, or a silver alloy.

9. The inflatable safety product of claim 1, wherein the metallic layer covers substantially an entire surface of the substrate.

10. The inflatable safety product of claim 1, further comprising a coating or film on the completely covering metallic layer.

11. The inflatable safety product of claim 1, further comprising:
- a first panel; and
- a second panel, the first panel and the second panel forming a seam region; and
- the fabric or flexible composite material as a seam tape, wherein the seam tape welds the first panel and the second panel in the seam region.

12. The inflatable safety product of claim 11, wherein the seam tape is adhered to the first panel and the second panel of the inflatable safety product to form a butt seam.

13. The inflatable safety product of claim 1, wherein the inflatable safety product is an inflatable evacuation slide, inflatable evacuation slide/raft, inflatable evacuation ramp, or inflatable evacuation slide/ramp.

14. The inflatable safety product of claim 1, wherein the fabric or flexible composite material is an accessory, and wherein the accessory is a patch, girt, handle, structural attachment, or pouch.

15. The inflatable safety product of claim 1, wherein the fabric or flexible composite material comprises a tensile strength of at least 190 lbs/in and a tear strength of at least 13 lbs/in.

16. An inflatable safety product comprising a fabric or flexible composite material, the fabric or flexible composite material comprising:
- a substrate; and
- a metallic layer covering at least one surface of the substrate,
- wherein an emissivity of the fabric or flexible composite material is less than or equal to 0.48,
- wherein the fabric or flexible composite material comprises a radiant heat resistance of at least 180 seconds, when exposed to radiant heat flux of 1.5 Btu/ft$^2$-sec or greater, for at least 180 seconds, and
- wherein the substrate comprises at least one of polyethylene, ultra-high molecular weight polyethylene, polypropylene, polyamide, aromatic polyamide, polyarylate, or a liquid crystal polymer.

17. The inflatable safety product of claim 16, wherein the metallic layer is discontinuous.

18. The inflatable safety product of claim 16, wherein the metallic layer is completely covering, and the emissivity is less than or equal to 0.25.

19. The inflatable safety product of claim 16, wherein the completely covering metallic layer is a vapor deposited metallic layer, a plated metallic layer, a sputtered metallic layer, a deposited metallic layer, an adhered metallic layer, a metallic foil layer, or a printed metallic layer.

20. A method of joining panels of an inflatable safety product, the method comprising adhering or welding a first panel and a second panel in a seam region formed by the first panel and the second panel using a seam tape, wherein:
- the seam tape comprises a substrate and a completely covering metallic layer covering at least one surface of the substrate;
- the substrate comprises polyethylene, ultra-high molecular weight polyethylene, polypropylene, polyamide, aromatic polyamide, polyarylate, or a liquid crystal polymer; and
- the seam tape comprises an emissivity of less than or equal to 0.48, wherein the seam tape comprises a radiant heat resistance of at least 180 seconds, when exposed to radiant heat flux of 1.5 Btu/ft$^2$-sec or greater, for at least 180 seconds.

21. An inflatable safety product comprising a fabric or flexible composite material as a seam tape, patch material, accessory material, or component material, wherein the fabric or flexible composite material comprises an emissivity of less than or equal to 0.25 and a radiant heat resistance of at least 180 seconds, when exposed to radiant heat flux of 1.5 Btu/ft$^2$-sec or greater, for at least 180 seconds, wherein the fabric or flexible composite material comprises:
- a substrate having opposing surfaces, the substrate comprising polyethylene, ultra-high molecular weight polyethylene, polypropylene, polyamide, aromatic polyamide, polyarylate, or a liquid crystal polymer;
- a metallic layer covering at least one of the opposing surfaces of the substrate; and
- an intermediate layer between the substrate and the metallic layer, wherein the intermediate layer is adhesive layer and/or a film layer.

* * * * *